United States Patent [19]

Bodem

[11] 4,088,035

[45] May 9, 1978

[54] WINDSHIELD WIPER DRIVE MECHANISM WITH DEPRESSED PARKING

[75] Inventor: Roy C. Bodem, Kettering, Ohio

[73] Assignee: General Motors Corporation, Detroit, Mich.

[21] Appl. No.: 613,258

[22] Filed: Sep. 15, 1975

[51] Int. Cl.² ............................................. F16H 21/40
[52] U.S. Cl. ..................................... 74/70; 15/250.17; 74/52
[58] Field of Search ............................... 74/70, 75, 52; 15/250.17, 250.27

[56] References Cited

U.S. PATENT DOCUMENTS

| | | | |
|---|---|---|---|
| 2,754,687 | 7/1956 | Brandon | 74/52 |
| 2,960,881 | 11/1960 | Perry et al. | 74/70 |
| 2,971,388 | 2/1961 | Koppel | 74/77 |
| 3,091,128 | 5/1963 | De Rees et al. | 74/75 |
| 3,282,120 | 11/1966 | Compton | 74/70 |
| 3,588,940 | 6/1971 | Mainka et al. | 15/250.17 |

Primary Examiner—Samuel Scott
Assistant Examiner—Wesley S. Ratliff, Jr.
Attorney, Agent, or Firm—Donald F. Scherer

[57] ABSTRACT

A windshield wiper drive mechanism having a hypocycloidal input and an oscillating crank output. A multiple component linkage is disposed between the input and output to convert the linear motion from the input to oscillating motion for the output. The linkage includes one member having a gear segment portion thereon, another member having an abutment surface thereon and a lost motion connection between the members. A parking mechanism including a gear rack and a stop member is operable, during parking of the wipers, to engage the gear segment and the abutment surface respectively thereby enforcing relative rotation between the members, as permitted by the lost motion connection, so that the output is oscillated through an extended arc to facilitate depressed parking of the wipers.

4 Claims, 7 Drawing Figures

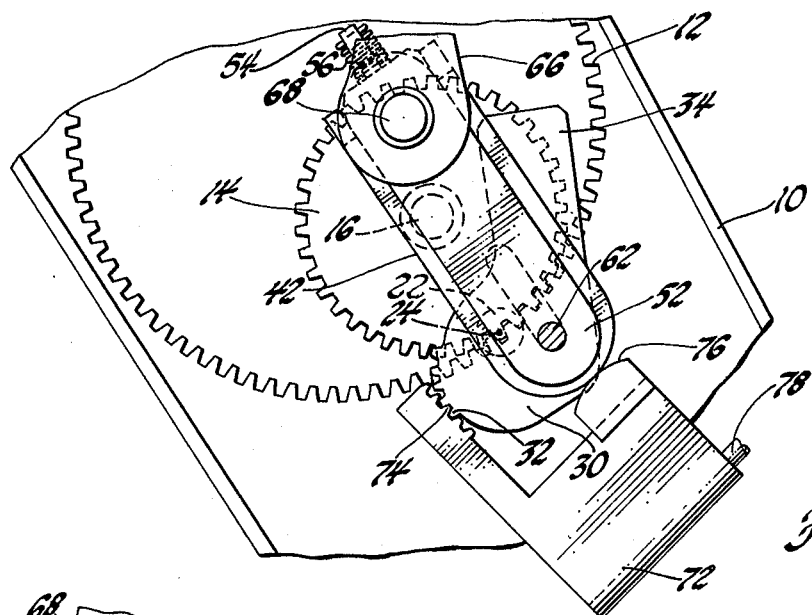
Fig. 3
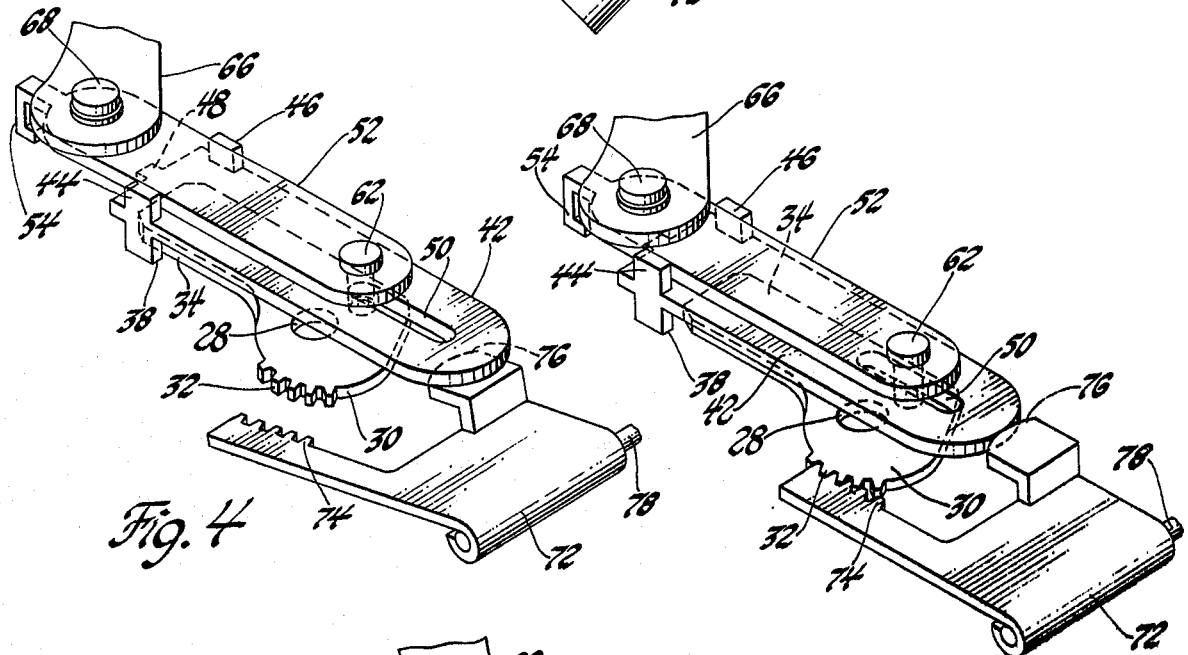
Fig. 4
Fig. 5
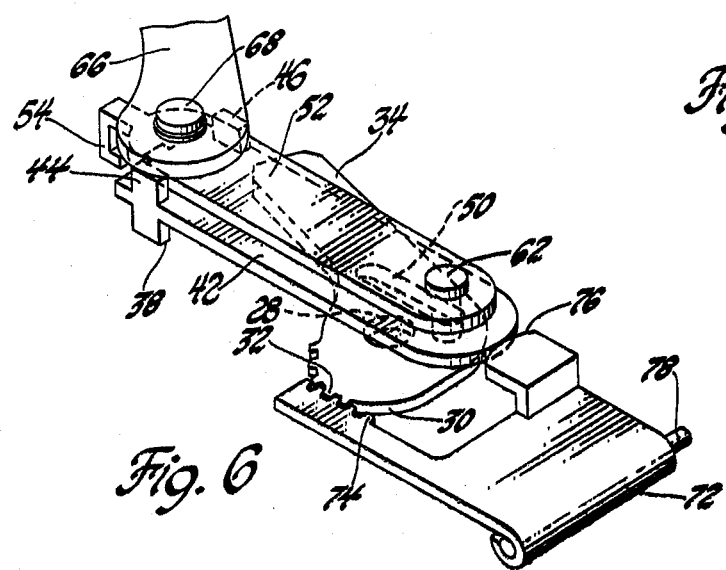
Fig. 6

WINDSHIELD WIPER DRIVE MECHANISM WITH DEPRESSED PARKING

This invention relates to windshield wiper drive mechanisms and more particularly to such drive mechanisms wherein a linkage is adapted to facilitate movement of the wipers to a parked position.

It is an object of this invention to provide in a windshield wiper drive mechanism an improved drive and parking linkage wherein a gear segment and a gear rack cooperate during parking to effect relative rotation between members of the linkage so that the output crank is driven through an extended arc outside the normal wipe pattern.

Another object of this invention is to provide in a windshield wiper drive mechanism an improved drive and parking linkage wherein a hypocycloid input provides a linear motion input drive of predetermined length, a crank arm output provides an oscillating output drive through a normal wipe pattern, and a linkage interconnecting the input and output converts the linear motion to oscillating motion and wherein the linkage includes relatively rotatable members which on engagement with a parking mechanism causes oscillation of the output beyond the normal wipe pattern without a corresponding change in the length of the linear motion.

A further object of this invention is to provide in a windshield wiper drive mechanism an improved drive and parking linkage wherein the linkage includes a plurality of members and is connected between the input and output drives of the mechanism to provide a normal wipe pattern of oscillating output converted from a rotary input and wherein one linkage member has a gear segment and another linkage member has a stop surface, a park member having a gear rack and a stop surface is also provided for selectively operating on the linkage gear segment and stop surface to enforce relative rotation between the members whereby the output is moved to a parked position outside the normal oscillating pattern.

These and other objects and advantages of the present invention will be more apparent from the following description and drawings wherein:

FIG. 3 is a partial top view showing the park position of the mechanism;

FIGS. 4, 5 and 6 are perspective views showing separate positions of the mechanism.

Figures 1, 2:
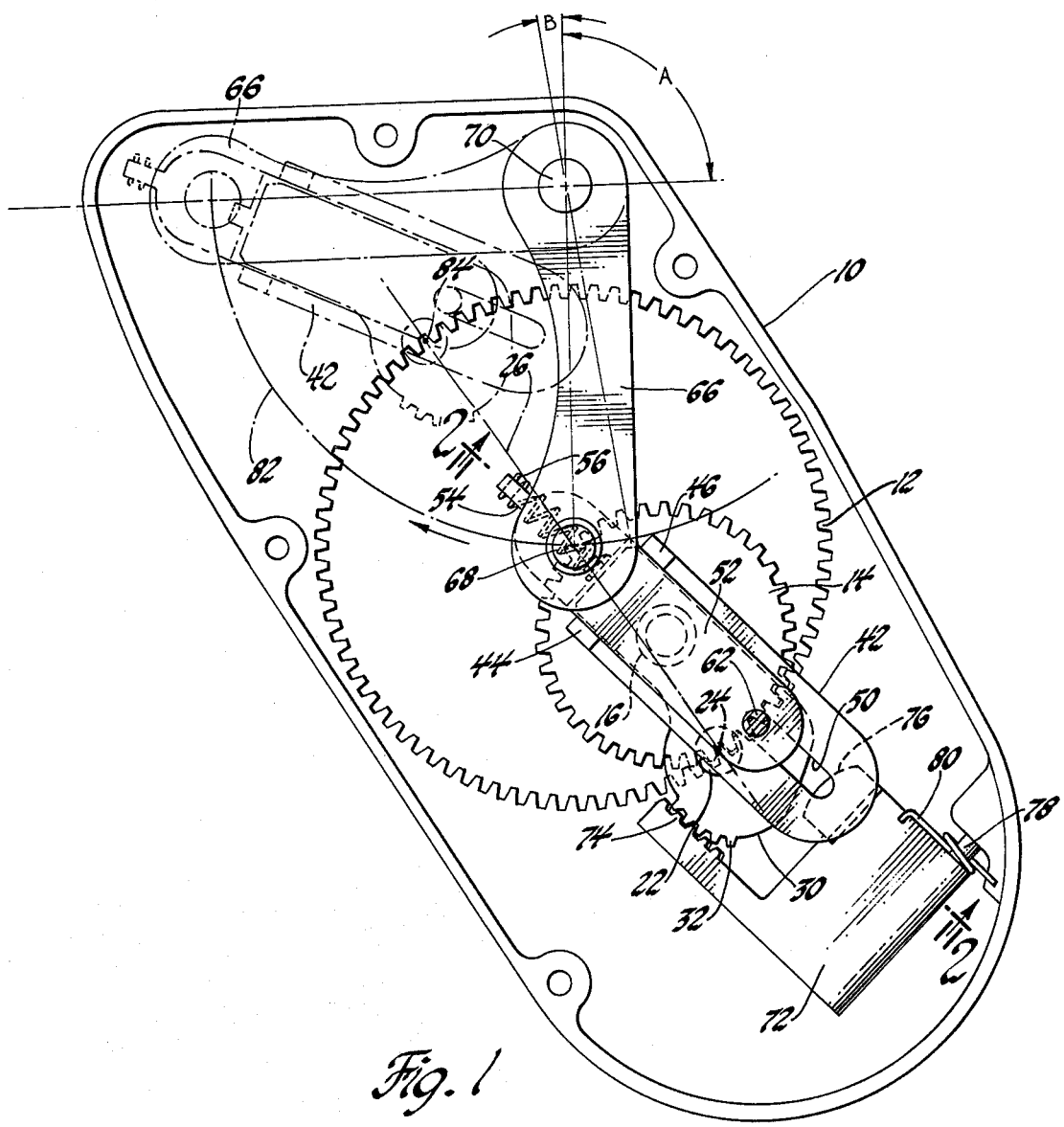
FIG. 1 is a top view of the preferred embodiment of the drive mechanism.
FIG. 2 is a sectional view taken along line 2—2 of FIG. 1.
Figure 7:
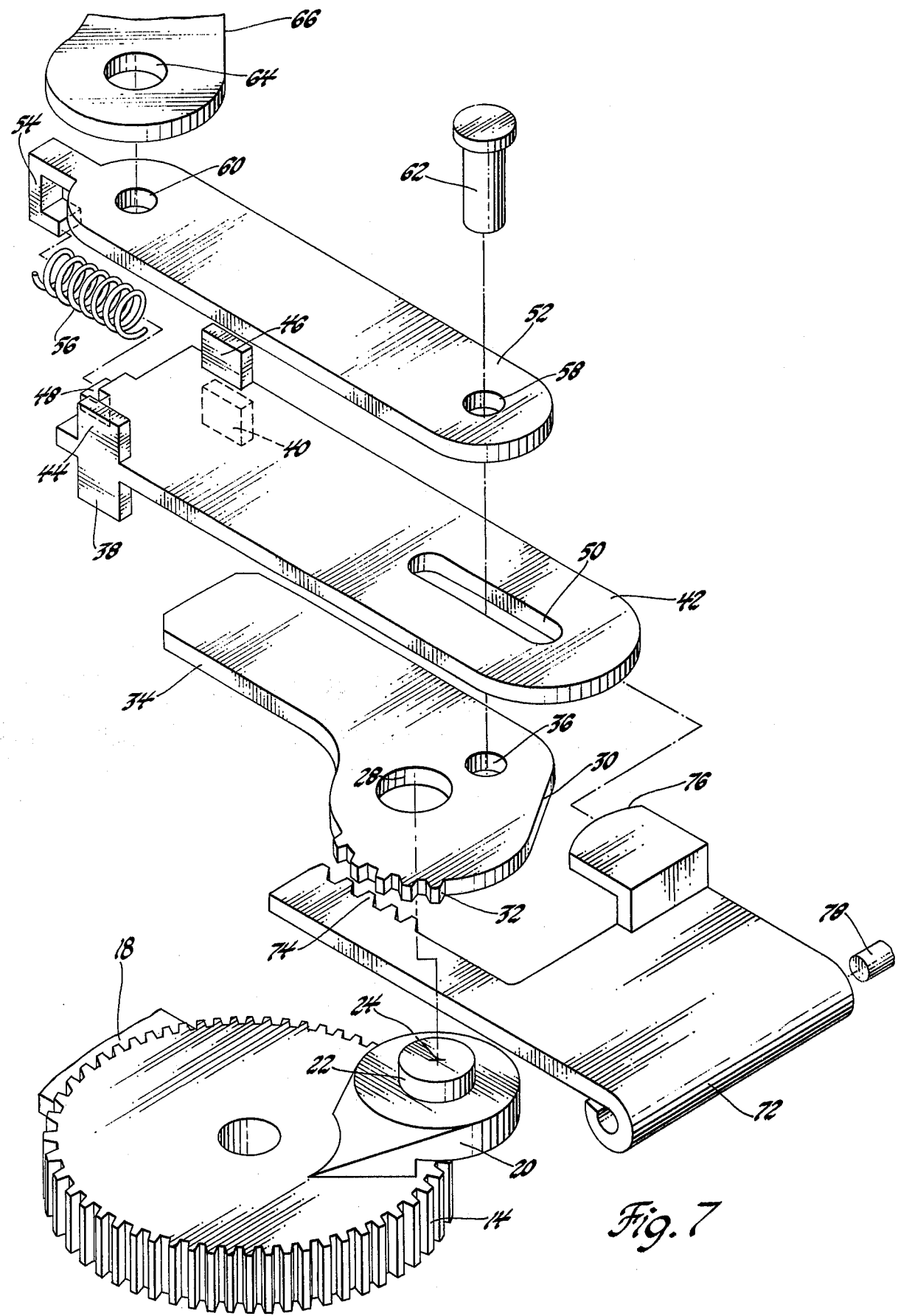
FIG. 7 is an exploded view of the mechanism.

Referring to the drawings wherein like characters represent the same or corresponding parts throughout the several views, there is shown in FIG. 1 a windshield wiper drive mechanism having a housing 10 in which is integrally formed or otherwise secured an internally toothed gear 12. Meshing with the gear 12 is a pinion gear 14 which, as seen in FIG. 2, is rotatably mounted on a pin 16 secured in a carrier or cage 18. The carrier 18 is rotatably driven by a conventional input drive, not shown, such as the worm gear arrangement described in U.S. Pat. No. 3,688,332 issued to J. D. Bellware. Sept. 5, 1972. As seen in FIG. 7, the gear 14 has formed thereon a drive lug 20 which has a cylindrical pin-like extension 22. The center-line 24 of the cylindrical extension 22 is aligned with the pitch circle of the gear 14. The gear 14 and gear 12 cooperate to form a hypocycloid arrangement which when the carrier 18 is rotatably driven, the centerline 24 progresses along a straight line 26 when the gear 14 is one-half the diameter of gear 12.

The cylindrical extension 22 serves as a pin which is fitted in an aperture 28 formed on a link component 30. The link component 30 is mounted loosely on the pin 22 so as to permit relative angular movement between the pin 22 and the link 30. The link 30 has formed thereon a gear segment 32, a second aperture 36 and a rectangular extension 34. The rectangular extension 34 is adapted to fit between tangs 38 and 40 formed on an intermediate link 42.

The intermediate link 42, which is generally rectangular in shape, has two other upstanding tangs 44 and 46 and a spring seat extension 48 formed at one end of the link 42 while the opposite end of link 42 is rounded. Also formed in the link 42 is a slot 50.

An upper link 52 is disposed between the tangs 44 and 46. One end of link 52 has formed thereon a spring seat 54. A compression spring 56 is fitted between the spring seats 54 and 48. The link 52 also has two apertures 58 and 60 formed therein. A pin 62 extends through the aperture 58, slot 50 and aperture 36 to provide a connection between the lines 30, 42 and 52. The spring 56 forces linear movement of the links 42 and 52 such that the pin 62 abuts one end of slot 50 thus setting the length of linkage and establishing the spring set relation between apertures 28 and 60. The slot 50, as will be seen later, permits relative linear movement between the links 30, 42 and 52, while the spring 56 maintains a linear force on the links 52 and 42. The aperture 60 is aligned with an aperture 64 formed in a drive link 66. The link 52 and link 66 are held together by a pin 68 which permits relative angular movement between the links. The link 66 is also connected to an output shaft 70 which is rotatably supported in the housing 10 and provides the oscillating output drive from the drive mechanism. The mechanism may be connected into a windshield wiper system such as that shown in U.S. Pat. No 2,866,344 issued to Reese, Dec. 30, 1958 or U.S. Pat. No. 3,699,605 issued to Bellware, Oct. 24, 1972. A parking mechanism 72 is also disposed within the housing 10 and is formed of a plate having a rack segment 74 and a stop surface 76. The mechanism 72 is rotatably disposed on a pin 78 and is held in a position away from the linkage by a torsional spring 80. The mechanism 72 may be moved from the downwardly deflected position shown in FIG. 2, to an upward level position as shown in FIG. 3. In the upward position, as shown in FIG. 3, the stop surface 76 abuts the rounded end of link 42 while the gear rack 74 is aligned to mesh with the gear segment 32. Movement of the stop mechanism 72 to the level or park position is preferably controlled by an electric solenoid, such that when it is wished to stop windshield wiper motion, the solenoid will be energized causing the stop mechanism 72 to rotate upwardly to the park position. The solenoid operation may be similar to that shown in U.S. Pat. No. 3,688,332.

During the normal wipe pattern, the drive mechanism is maintained in the relative position shown in FIG. 1. That is, the pin 62 abuts the end of slot 50 as shown. During wiping, the centerline 24, as previously mentioned, extends along the path 26. The movement of centerline 24 along this path causes the three link members 30, 42 and 52 to move in the same general direction. Due to the pivotal connection at pin 68, however, the linkage skews slightly as the centerline traverses the path 26. This movement is determined by the radius 82 along which the pin 68 travels as determined by the centerline of the output shaft 70.

When the wiper system is turned off and parking is desired, the stop mechanism 72 is moved to the level position shown in FIGS. 3, 5 and 6 by the solenoid. The stop surface 76 abuts the link 42 prior to the time the gear 32 meshes with rack 74. The pin 62 is moved to approximately the center of slot 50, as shown in FIG. 5, when the two gear portions mesh. As seen in FIG. 5, this movement of pin 62 relative to link 42 causes the link 30 to withdraw from between tabs 38 and 40. It also causes linear movement of the pin 68 and link 52. However, the link 52 remains trapped between the tangs 44 and 46. Further movement of the linkage along path 26 causes the link 30, due to the mesh between the gears 32 and 74, to rotate relative to the links 42 and 52. This relative rotation is about the axis 24 such that the pin 62 also rotates in an arc about the axis 24 causing further movement within the slot 50. This movement of pin 62 causes linear shifting of link 52 which results in an extra amount of angular movement of the link 66. On reaching the park position, as seen in FIGS. 3 and 6, the link 30 is rotated approximately 40° relative to its running position and the links 52 and 42 are rotated approximately 10° relative to their running position.

During normal wiping the output shaft 70 is rotated through an angle A as seen in FIG. 1. When the windshield wipers are parked, the wipers pass through an extended angle B, which moves the wipers preferably off the windshield and out of the line of vision of the operator. This park angle B is caused by the relative movement between the links 30, 42 and 52 as controlled by the lost motion mehanism formed by pin 62 and slot 50 and spring 56.

When the wipers are again activated, the mechanism will move along line 26 from point 24 toward point 84. During this movement, the spring 56 maintains a sufficient frictional force between the gear segments such that the stop mechanism will remain in the level position until the pin 62 is returned to approximately the half-way point of slot 50 at which point the gears 32 and 74 come out of mesh and the linkage 30 is moved back between tangs 38 and 40 to hold the linkage in their desired relative positions for wiping operation. The linkage will remain in these relative positions until parking is again desired.

In lieu of relying on the frictional engagement of the gears to maintain the park linkage in the upper position, the stop mechanism 72 may be provided with a small lip extending outwardly from the top of stop surface 76. The lip portion would rest on top of link 42 such that the stop mechanism cannot be returned to its spring set position until the linkage has traversed along the path 26 a sufficient distance for the lip to clear the rounded edge of link 42.

Obviously, many modifications and variations are possible in light of the above disclosure. It is therefore to be understood that within the scope of the appended claims, the invention may be practiced otherwise than as specifically described.

I claim:

1. A windshield wiper drive mechanism having an input member that continuously rotates during wiping, an output crank member driven in wiping oscillation through a predetermined arc during wiping and driven outside one limit of the predetermined arc for parking, and lever means for connecting said input member to said output crank to convert the rotary input motion to oscillating output motion during wipe and upon conclusion of wipe driving the output member to the park position, wherein the improvement comprises; a linkage transmission means having a plurality of linkage components operatively interconnected and spring loaded to establish a predetermined length between said input member and said output crank member during wiping to effect said predetermined arc, including a gear segment formed on one of said linkage components and a stop surface formed on another of said linkage components; and selectively operable parking means having a toothed rack portion and a stop portion, said toothed rack selectively engaging said gear segment when park is to be effected so that the one linkage is rotated relative to said toothed rack by the gear engagement and said stop portion abuts said stop surface so that the other of said linkage components is rotated to a lesser degree by the gear engagement and abutment with the stop surface so as to establish positioning of the output crank member outside the limit of the predetermined arc.

2. A windshield wiper drive mechanism having an input member that continuously rotates during wiping, an output crank member driven in wiping oscillation through a predetermined arc during wiping and driven outside one limit of the predetermined arc for parking, and lever means for connecting said input member to said output to convert the rotary input motion to oscillating output motion during wipe and upon conclusion of wipe driving the output member to the park position, wherein the improvement comprises; linkage transmission means having a plurality of linkage components operatively interconnected and spring loaded to establish a predetermined length between said input member and said output crank member during wiping to effect said predetermined arc, including a gear segment formed on one of said linkage components, a stop surface formed on another of said linkage components and lost motion means interconnecting said linkage components; and selectively operable parking means having a toothed rack portion and a stop portion for selectively engaging said gear segment when park is to be effected and to abut said stop surface so that the one linkage is rotated relative to said toothed rack by the gear engagement between the gear segment and the toothed rack portion and the other of said linkage components is rotated to a lesser degree by engagement with the stop surface and by the relative motion therebetween permitted by said lost motion means so as to establish positioning of the output crank member outside the limit of the predetermined arc.

3. A windshield wiper drive mechanism having an input member that continuously rotates during wiping, an output crank member driven in wiping oscillation through a predetermined arc during wiping and driven outside one limit of the predetermined arc for parking, and lever means for connecting said input member to said output crank to convert the rotary input motion to oscillating output motion during wipe and upon conclusion of wipe driving the output member to the park position, wherein the improvement comprises; a linkage transmission means having three linkage components operatively interconnected and spring loaded to establish a predetermined length between said input member and said output crank member during wiping to effect said predetermined arc, including a gear segment formed on the first of said linkage components, a stop surface formed on the second of said linkage components and lost motion means comprising a slot in said second linkage component and a rotatably disposed pin in said first and third linkage components and being slidably disposed in said slot; and selectively operable parking means having a toothed rack portion and a stop portion for selectively engaging said gear segment when park is to be effected and to abut said stop surface so that the first linkage component is rotated relative to said toothed rack by the gear engagement between the gear segment and toothed rack portion and the second and third of said linkage components are rotated to a lesser degree by abutment of the stop portion with the stop surface and by the relative motion therebetween permitted by movement of said pin in said slot of said motion means so as to establish positioning of the output crank member outside the limit of the predetermined arc.

4. A windshield wiper drive mechanism having an input member that continuously rotates during wiping, an output crank member driven in wiping oscillation through a predetermined arc during wiping and driven outside one limit of the predetermined arc for parking, and lever means for connecting said input member to said output crank to convert the rotary input motion to oscillating output motion during and upon conclusion of wipe driving the output member to the park position, wherein the improvement comprises; a linkage transmission means having three linkage components operatively interconnected and spring loaded to establish a predetermined length between said member and said output crank member during wiping to effect said predetermined arc, including toothed driven means formed on the first of said linkage components and stop means formed on the second of said linkage components and lost motion means comprising a slot in said second linkage component and a rotatably disposed pin in said first and third linkage components and being slidably disposed in said slot; and selectively operable parking means having toothed drive means complementary to said toothed driven means and a stop portion for selectively engaging said toothed driven means when park is to be effected to produce relative rotation between the toothed drive and driven means and to abut said stop means so that the first linkage component is rotated due to the relative rotation of the toothed drive and driven means and the second and third of said linkage components are rotated to a lesser degree by abutment of the stop means and stop portion and by the relative motion therebetween permitted by movement of said pin in said slot of said lost motion means so as to establish positioning of the output crank member outside the limit of the predetermined arc.

* * * * *

UNITED STATES PATENT AND TRADEMARK OFFICE
CERTIFICATE OF CORRECTION

PATENT NO. : 4,088,035
DATED : May 9, 1978
INVENTOR(S) : Roy C. Bodem

It is certified that error appears in the above-identified patent and that said Letters Patent are hereby corrected as shown below:

Column 4, line 27, "output to convert" should read -- output crank to convert --.

Column 4, line 30, before "linkage" insert -- a --.

Column 6, line 3, "between said member" should read -- between said input member --.

Signed and Sealed this

Twenty-third Day of January 1979

[SEAL]

Attest:

RUTH C. MASON
Attesting Officer

DONALD W. BANNER
Commissioner of Patents and Trademarks